United States Patent [19]

Fama

[11] Patent Number: 4,591,095

[45] Date of Patent: May 27, 1986

[54] SINGLE-PRESSURE ACTUATED CONTROL SYSTEM FOR COMPRESSED AIR SPRAYING OF WATER

[75] Inventor: Joseph T. Fama, 1701 Briggs Chaney Rd., Silver Spring, Md. 20904

[73] Assignee: Joseph T. Fama, Silver Spring, Md.

[21] Appl. No.: 618,552

[22] Filed: Jun. 8, 1984

[51] Int. Cl.[4] .......................... B05B 3/14; F16K 24/00

[52] U.S. Cl. .................................... 239/102; 137/111; 137/897

[58] Field of Search ............... 137/111, 238, 895, 897; 239/102

[56] References Cited

U.S. PATENT DOCUMENTS

| | | | |
|---|---|---|---|
| 2,583,986 | 1/1952 | Bahnson | 137/111 X |
| 4,042,016 | 8/1977 | Boochever et al. | 165/20 |
| 4,118,945 | 10/1978 | Boochever et al. | 239/102 X |
| 4,298,017 | 11/1981 | Hetherington | 137/111 X |

*Primary Examiner*—Joseph F. Peters, Jr.
*Assistant Examiner*—David P. Davidson
*Attorney, Agent, or Firm*—Staas & Halsey

[57] ABSTRACT

In a single-pressure actuated control system for compressed air spraying of water, a rising pressure of an air supply line actuates an air valve to supply the air to the nozzle and to a tank, and a water valve is subsequently actuated by the pressure from the air valve to supply water to the nozzle. As the air supply pressure falls, first the air valve and then the water valve closes, and the air stored in the tank drains water downstream of the water valve to prevent dripping from the nozzle.

10 Claims, 5 Drawing Figures

SINGLE-PRESSURE ACTUATED CONTROL SYSTEM FOR COMPRESSED AIR SPRAYING OF WATER

BACKGROUND OF THE INVENTION

The field of the invention relates to a process commonly used in air conditioning and environmental control systems, namely the spraying or injection of water vapor into an air stream. This lowers the temperature of the air stream by the evaporative cooling effect, while simultaneously raising the relative humidity of the air stream.

A common method has been to use a pump to spray water from a "spray header" consisting of a grouping of nozzles. The spray header is located in the air stream to be treated, the water that is not absorbed by the air stream falls into a pan underneath the spray header, and the unused water in the pan is returned to the suction of the pump. As described in U.S. Pat. Nos. 4,042,016 and 4,118,945, more recently a system has been developed that uses an ultrasonic nozzle, with compressed air as the driving medium, to generate very fine water vapor that is easily evaporated into the air stream.

There are several problems and shortcomings associated with the prior art control and piping systems that have been developed to date, for instance, as illustrated in FIG. 1, to control the amount of compressed air and water to the ultrasonic nozzle. Known control systems commonly use pneumatic control air in order to stage and sequence the various components of the system. This is particularly important when, in order to avoid dripping water after the ultrasonic nozzle is turned off, it is necessary to keep the compressed air running through the nozzle for a period of time after the water has been turned off, so as to clear the lines. This requirement adds to the number of control components.

There are also situations in which no pneumatic control air is available. Therefore, the control system must be electric or electronic. This tends to lead to a greater than desirable number of control relays. As an example, FIG. 2 shows an electrical wiring diagram for a control to supply compressed air and water to the ultrasonic nozzle. The diagram shows the open contacts of the single-pole relays R-1 and R-2, the three pole relay R-3, the time delay single-pole relays TDR-1 and TDR-2, and the air and water solenoids.

The basic sequence of operation of the prior art control system of FIG. 2 is as follows:

1. When the space humidistat calls for humidity, and the various safety controls are electrically closed, the relay R-1 is energized.

2. If the air handling unit fan is running, then the relay R-2 is energized.

3. When the relays R-1 and R-2 are energized, the relay R-3 is powered.

4. As soon as the relay R-3 is powered, the air solenoid opens, thus providing compressed air to the ultrasonic nozzle. After a set period of time, for instance 20 seconds, the time delay relay TDR-1 switches electrically, and the water solenoid opens. At this point the ultrasonic nozzle generates the humidification mist.

5. When humidity is no longer required in the space, the relay R-1 is de-energized. At this point the water solenoid closes immediately, and the air solenoid is held open for a fixed period of time, for instance 20 seconds, by the time delay relay TDR-2, to clear the lines of water and prevent dripping.

This control arrangement requires several electrical components, and a control panel to mount them in.

One of the approaches recently taken to address the problem of water dripping after the water flow stops is to install a three-way valve in the water piping, as shown in FIG. 3. When the water is not required, the valve allows the water to drain from the ultrasonic nozzle, either by gravity or under the compressed air pressure remaining in the ultrasonic nozzle.

SUMMARY OF THE INVENTION

A main object of the present invention is to provide a method of controlling the compressed air and water to a nozzle, which will eliminate the disadvantages of prior art controls in humidifier systems, by making the control valves compressed-air powered, thus eliminating the need for a large portion of the electric, electronic and other controls required in prior art systems.

It is a further object of the present invention to eliminate the dripping of water in an ultrasonic nozzle after shutdown, by incorporating a compressed air storage tank within the outlet piping to allow for sufficient compressed air to be discharged through the nozzle, thus sufficiently clearing the water lines downstream of the water control valve after it is shut off.

It is still a further object of the invention to allow for a compact and simple arrangement that can be easily adapted to existing air conditioning units and systems.

DESCRIPTION OF THE PREFERRED EMBODIMENTS

Figure 4:
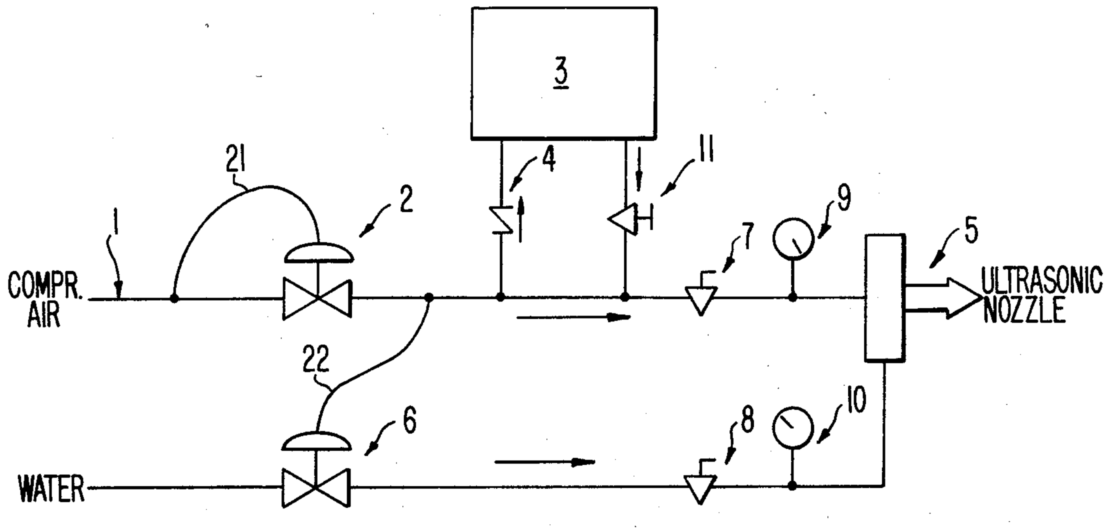
FIG. 4 shows an embodiment of the present invention.

FIG. 4 illustrates graphically the layout of a preferred embodiment of the present invention. The pressure in the compressed air supply line 1 is raised and lowered by an external source, such as by the opening or closing of a solenoid valve (not shown in FIG. 4), for example the air solenoid shown in FIG. 5. At a certain pressure of the air supply line 1, the air valve 2, which senses the air pressure supplied to it via the line 21, opens.

The compressed air passing through the air valve 2 flows into the storage tank 3 via the check valve 4, and also starts to flow through an air passage of the ultrasonic nozzle 5. After a certain period of time, the section of the assembly from the air valve 2 to the ultrasonic nozzle 5 is pressurized to a point which causes the water valve 6 to open, namely via the line 22.

When the water valve 6 is open, the spraying of water vapor through the ultrasonic nozzle 5 commences. An air needle valve 7 and a water needle valve 8 are used to adjust the respective flows, while the air pressure gauge 9 and the water pressure gauge 10 monitor the operating conditions.

When the pressure in the compressed air supply line 1 is lowered below a switching point of the air valve 2, this is transmitted via the line 21, and the air valve 2 closes to shut off the supply of compressed air to the assembly. The pressure downstream of the air valve 2 is mantained for a period of time by the storage tank 3. When the air pressure downstream of the air valve 2 drops sufficiently, this is transmitted via the line 22 the water valve 6 closes and the water that is in the line between the water valve 6 and the ultrasonic nozzle 5 is emptied by the air pressure in the tank 3. Gradually, the air pressure in the tank 3 falls to equilibrium with its surroundings. The rate of flow of air from the tank 3 is controlled by the tank air control valve 11.

Further design criteria to be generally considered are that:

the water valve 6 should be located as close as possible to the nozzle 5;

the two air line connections to the storage tank 3 should be the same diameter as the piping from the air valve 2 to the nozzle 5;

the check valve 4 should be either spring loaded or of the gravity type, and placed below the storage tank 3;

the air valve 2 and the water valve 6 may be those manufactured by Automatic Switch Co., models P262 or P210, or equivalents;

the capacity of the storage tank 3 should be between 20 and 50 times the volume of the compressed air piping from the air valve 2 to the ultrasonic nozzle 5; and the tank 3 should be mounted above the nozzle 5, and the tank 3 and the piping leading from it to the main compressed air piping between the air valve 2 and the nozzle 5 should be designed so as to drain any water that may condense in tank 3.

Figure 1:
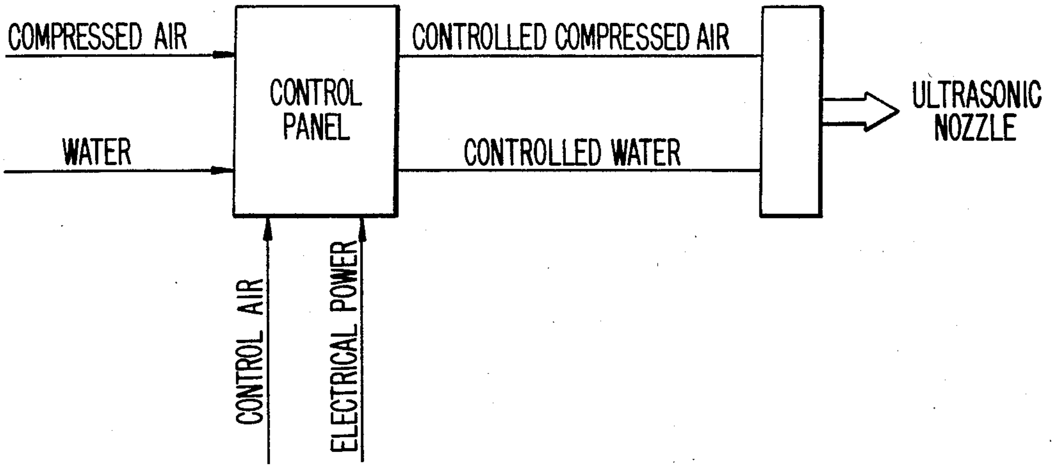
FIG. 1. (PRIOR ART)
FIG. 1 shows a schematic view of a prior art control system for spraying water from an ultrasonic nozzle.
Figure 3:
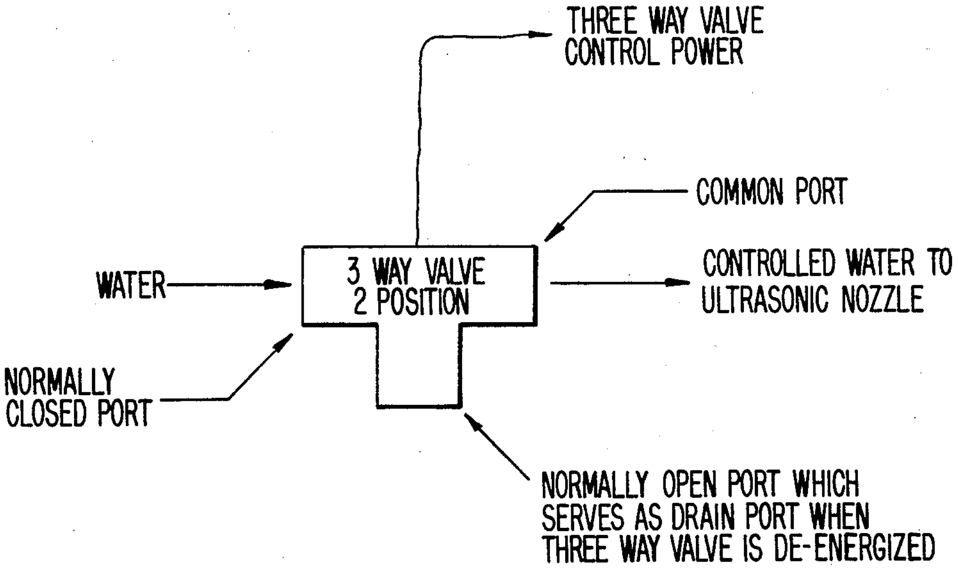
FIG. 3. (PRIOR ART)
FIG. 3 shows a prior art use of a three-way valve for draining water from an ultrasonic nozzle after spraying.
Figure 2:
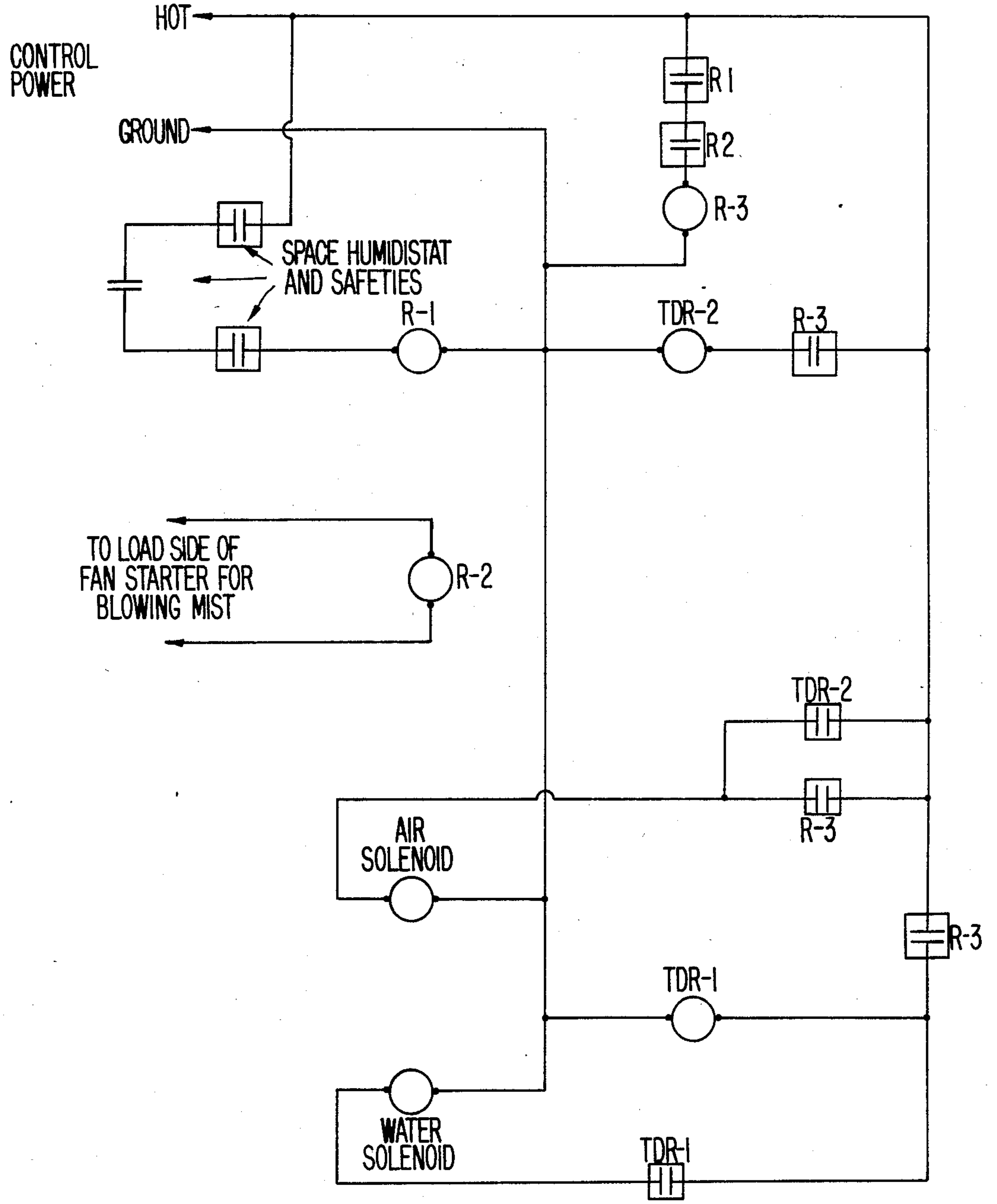
FIG. 2. (PRIOR ART)
FIG. 2 shows a wiring diagram of a prior art system for spraying water.
Figure 5:
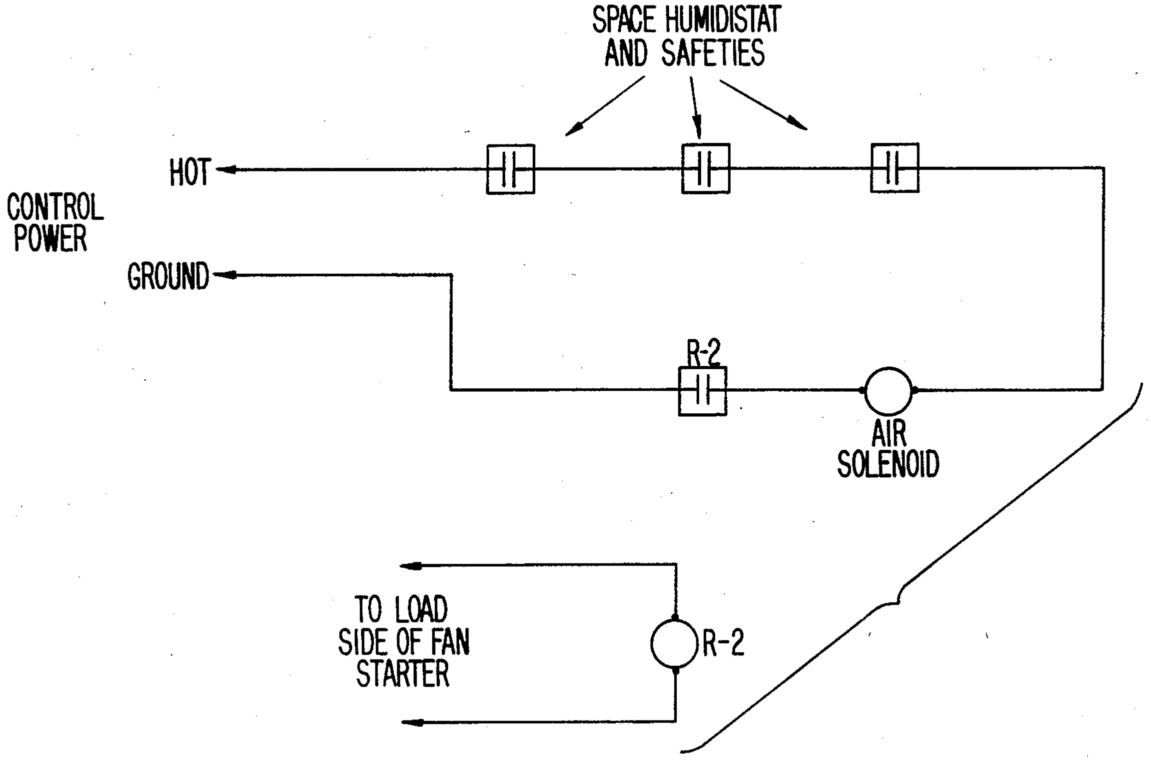
FIG. 5 shows a wiring diagram of the control system of the present invention, for comparison with the prior art of FIG. 2, for indicating components which can be eliminated by the present invention.

FIG. 5 indicates a wiring diagram of an example of a control system for supplying air to the air valve 2 of FIG. 4 according to the present invention, as one example. Comparison of the prior art control circuitry of FIG. 2, with the combination of FIG. 4 and FIG. 5, indicates the simplification in the control system provided by the present invention, including the feature of operating the nozzle according to a single input pressure. The arrangement of FIG. 5 requires only two components to control the supply of the compressed air and water to the ultrasonic nozzle. The fan interlock relay R-2 remains, and the only other component is the air solenoid, which, when it opens, actuates the system with the single air pressure input.

I claim:

1. A control system for spraying water from a nozzle with compressed air, comprising a first valve connected to and operated by a supply of compressed air, means for opening said first valve to pass said air when the pressure of said supply is sufficiently high and for closing said first valve when the pressure is sufficiently low, a tank connected to receive the air passed by said first valve, a second valve connected to a supply of water and controlled by the pressure of the air passed by said first valve, means for opening said second valve when the pressure of said passed air rises sufficiently high and for closing said second valve when the pressure of said passed air falls sufficiently low, a nozzle connected to receive the air and water passed by said first and second valves, and means for continuing to supply air for a period of time to said nozzle from said tank after both said valves are closed, to remove at least a part of the water downstream of said second valve to prevent water from dripping from said nozzle.

2. The system of claim 1, comprising a first line connecting said first valve and said nozzle, said tank being connected to said first line, and the air pressure in said first line operating said second valve.

3. The system of claim 2, comprising said tank being connected to said first line by a second line, a check valve included in said second line for limiting the direction of flow of air through said second line to be only into said tank, and a third line connecting said tank and said first line for allowing the air in said tank to flow to said first line.

4. The system of claim 3, comprising an air control valve in said third line to control the flow of air from said tank, an air needle value in said first line between said third line and said nozzle, and a water needle valve between said second valve and said nozzle, said needle valves respectively regulating the amount of air and water supplied to said nozzle.

5. The system of claim 1, 2, 3 or 4, said nozzle being an ultrasonic nozzle.

6. The system of claim 1, 2, 3, or 4, wherein said first valve opens when the pressure of said supply of compressed air rises to a respective predetermined high value, and said first valve closes when the pressure of said supply of compressed air falls to a respective predetermined low value.

7. The system of claim 6, said nozzle being an ultrasonic nozzle.

8. The system of claim 6, comprising means for controlling said pressure of said supply of compressed air for causing said nozzle to spray the water on demand, said means including an air solenoid between said supply of compressed air and said first valve, and a relay to operate said air solenoid depending on whether said water is to be sprayed.

9. The system of claim 8, wherein a start up function is provided in that, when said valves open, the air is first provided to said nozzle before the water is supplied to said nozzle.

10. The system of claim 8, said nozzle being an ultrasonic nozzle.

* * * * *